United States Patent
Masticola et al.

(10) Patent No.: US 6,865,450 B2
(45) Date of Patent: Mar. 8, 2005

(54) SCHEDULE-BASED LOAD ESTIMATOR AND METHOD FOR ELECTRIC POWER AND OTHER UTILITIES AND RESOURCES

(75) Inventors: Stephen Masticola, Kingston, NJ (US); William A. Landi, Hamilton, NJ (US); Dilip Soni, Kingston, NJ (US); Peter Spool, Highland Park, NJ (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 233 days.

(21) Appl. No.: 10/142,401

(22) Filed: May 9, 2002

(65) Prior Publication Data

US 2003/0050738 A1 Mar. 13, 2003

Related U.S. Application Data

(60) Provisional application No. 60/290,164, filed on May 10, 2001.

(51) Int. Cl.$^7$ ................................................. H02J 1/14
(52) U.S. Cl. ..................................... 700/291; 705/412
(58) Field of Search ................................ 700/291, 293, 700/295, 286; 705/10, 412, 1; 702/60–62, 177, 183

(56) References Cited

U.S. PATENT DOCUMENTS

| | | | | |
|---|---|---|---|---|
| 5,566,084 A | * | 10/1996 | Cmar ......................... | 700/276 |
| 6,366,889 B1 | * | 4/2002 | Zaloom ......................... | 705/7 |
| 6,529,839 B1 | * | 3/2003 | Uggerud et al. .............. | 702/61 |
| 2003/0216971 A1 | * | 11/2003 | Sick et al. ..................... | 705/26 |

* cited by examiner

Primary Examiner—Leo Picard
Assistant Examiner—Chad Rapp

(57) ABSTRACT

A method for schedule-based load estimation in a system including a utility energy provider and a utility energy consumer, comprises the steps of generating a near-term proposed schedule set containing at least one near-term proposed schedule for operation of power-consuming resources; monitoring energy consumption of the consumer for providing a set of historical consumption data; providing from priorly stored data a set of historical schedule data for the consumer; providing a set of historical unscheduled factors that affect the consumer's power consumption; providing a set of unscheduled factor predictions; and performing a correlation operation on the near-term proposed schedule set, the set of historical consumption data, the set of historical schedule data, the set of historical unscheduled factors, and the set of unscheduled factor predictions, for providing a respective near-term load estimate for each near-term proposed schedule in the near-term proposed schedule set.

5 Claims, 2 Drawing Sheets

System Overview

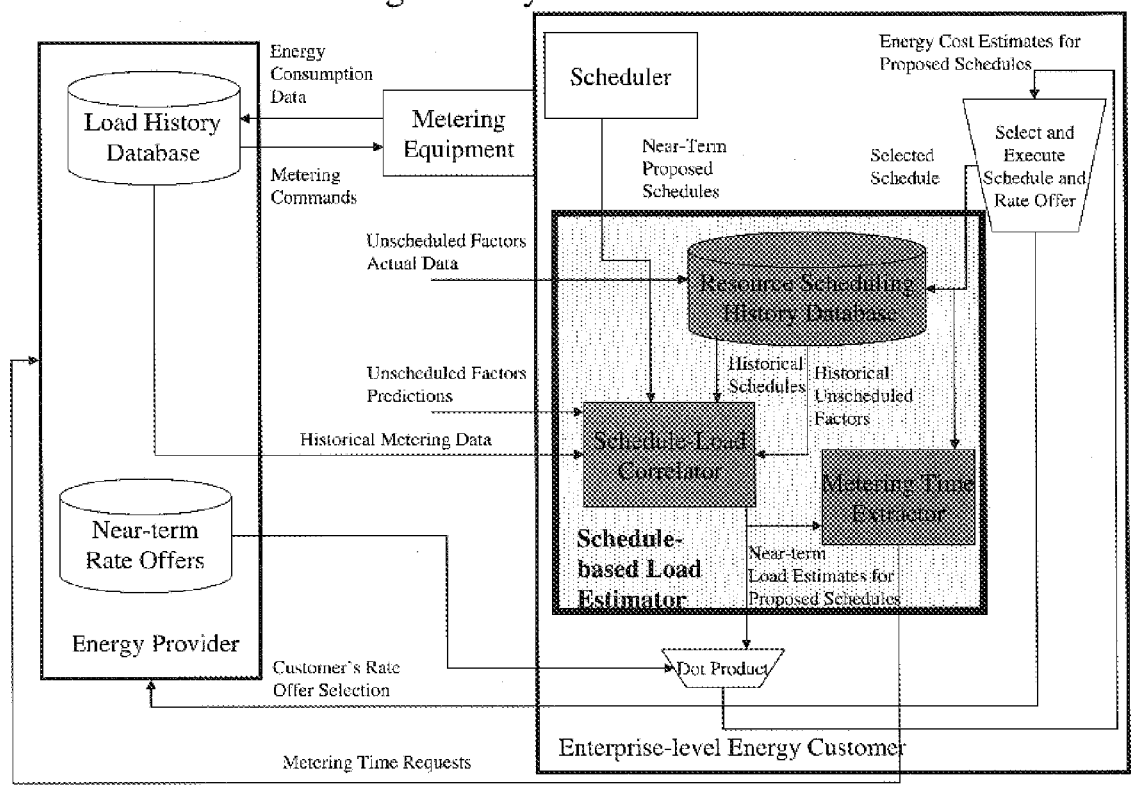
Figure 1: System Overview

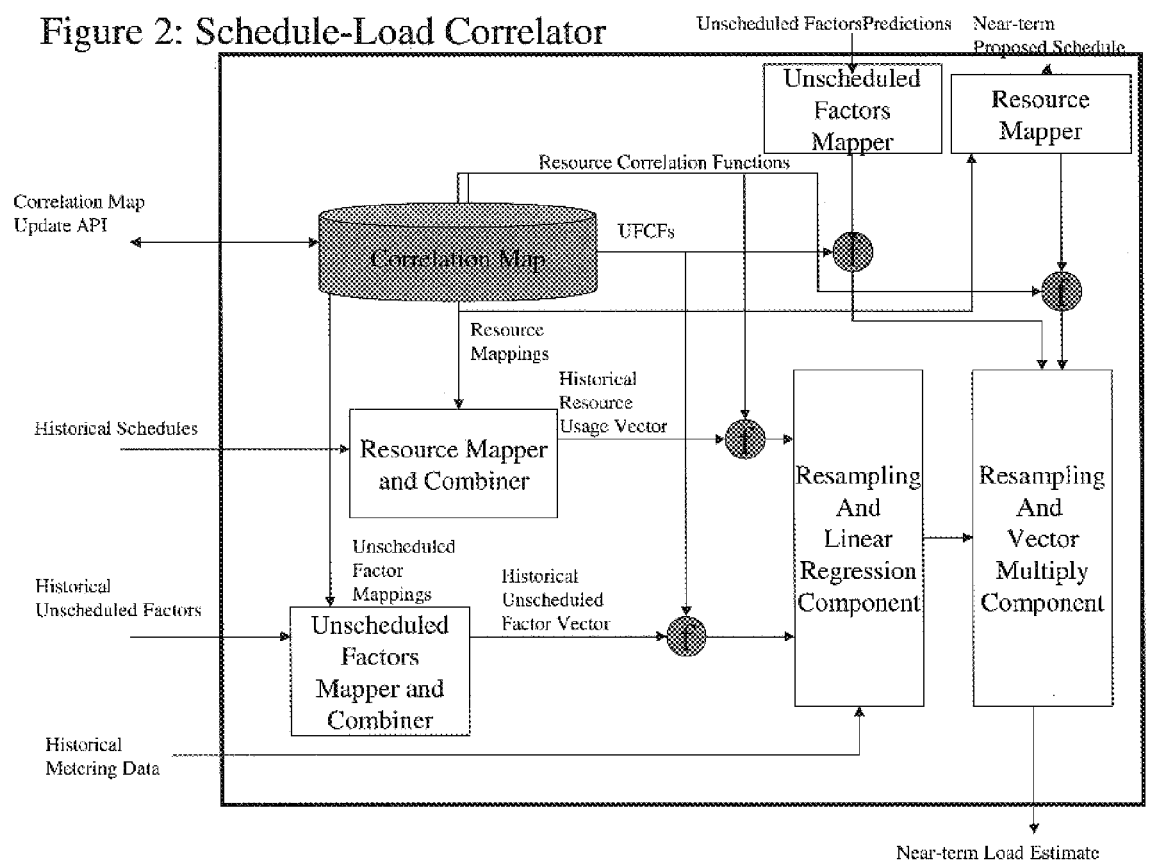

SCHEDULE-BASED LOAD ESTIMATOR AND METHOD FOR ELECTRIC POWER AND OTHER UTILITIES AND RESOURCES

Reference is hereby made to copending Provisional Patent Application No. 60/290,164 filed May 10, 2001 in the name of Masticola et al., entitled SCHEDULE-BASED LOAD ESTIMATOR FOR ELECTRIC POWER AND OTHER UTILITIES AND RESOURCES and of which priority is claimed and which is hereby incorporated herein by reference.

FIELD OF THE INVENTION

The present invention relates to a system and method for load estimation and, more specifically, to a schedule-based load estimator for providing an accurate near-term estimate of a load profile or usage for facilitating optimization of operations and costs.

BACKGROUND OF THE INVENTION

In the prior art, such estimates and schedule and rate offer selections were typically made manually by employees of either the enterprise or the utility supplying a commodity, such as electric power, who were assigned this task.

In the case of manually produced estimates, operating costs were generally high. The cost of hiring and training the employees who produced the ad-hoc estimates typically makes such process prohibitively expensive for all but the largest sites. In addition, implementation cost is high. It is difficult for the estimators to determine the utility consumption of a scheduled resource, such as a machine or production line, without installing submetering equipment for the resource. Furthermore, the submeters had to be read manually or communication equipment has to be installed to read them automatically. This adds to the expense of doing the estimation in the manual manner. Accuracy is low and human error often makes the estimations themselves unreliable. Opportunity for integration within an enterprise using a manual system was limited. The ad-hoc estimates generally cannot be used to automate the business interactions of the enterprise and the utility.

With this type of manual operation, pportunity for trade remains limited. The ad-hoc estimates cannot generally be traded as an information product. Moreover, the overall market for manually obtained estimation is severely limited. Because the estimation process is so cumbersome, typically only those enterprises with the largest sites went through it at all.

Usefulness of such manually derived estimates outside the enterprise was limited. Because so few enterprises produced estimates, utilities had little opportunity to use the estimates of its customers to optimize its own operations.

The difficulty of producing reliable estimates has contributed to inelastic demand for utilities. Because most enterprises could not adapt their schedules to utility price structures, the price of the utility made little difference in instantaneous total consumption. In the deregulated electric power industry, this leads to spiraling prices in times of shortages and missed opportunities for profit in times of surpluses.

Background material is found in, for example, the following U.S. patents:

U.S. Pat. No. 3,602,703, POWER DEMAND PREDICTING CONTROL SYSTEM, issued Aug. 31, 1971 in the name of Polenz;

U.S. Pat. No. 3,789,201, SIMULATED LOAD FORECAST AND CONTROL APPARATUS, issued Jan. 29, 1974 in the name of Carpenter et al.;

U.S. Pat. No. 4,916,328, ADD/SHED LOAD CONTROL USING ANTICIPATORY PROCESSES, issued Apr. 10, 1990, in the name of Culp, III; and U.S. Pat. No. 5,963,457, ELECTRICAL POWER DISTRIBUTION MONITORING SYSTEM AND METHOD.

See also the article: Handschin, E. and Doernemann, Ch., "Bus Load Modeling and Forecasting," IEEE Trans. Power Systems, 3:2, May 1988, 627–633. The technique relies on the use of "normalized load curves" and thus applies only to wide-area forecasting.

While predicting utility consumption on low levels (machines, devices, loads, etc) from known device characterizations or patterns is known, the present invention discloses predicting utility consumption where no such patterns are known, and where the low-level scheduling of individual devices cannot be easily derived from the higher-level schedule.

While the predicting of utility consumption on very large scales (cities or states), using primarily unscheduled factors such as weather, is known, and while such an approach may generally be adequate for such large-scale prediction, it is herein recognized that for smaller, site-scale utility users, in which production and other schedules can heavily influence utility consumption, such a wide-scale statistical approach would not be sufficiently accurate.

SUMMARY OF THE INVENTION

In accordance with another aspect of the present invention, a method for schedule-based load estimation in a system including a utility energy provider and a utility energy consumer, comprises the steps of generating a near-term proposed schedule set containing at least one near-term proposed schedule for operation of power-consuming resources; monitoring energy consumption of the consumer for providing a set of historical consumption data; providing from priorly stored data a set of historical schedule data for the consumer; providing a set of historical unscheduled factors that affect the consumer's power consumption; providing a set of unscheduled factor predictions; and performing a correlation operation on the near-term proposed schedule set, the set of historical consumption data, the set of historical schedule data, the set of historical unscheduled factors, and the set of unscheduled factor predictions, for providing a respective near-term load estimate for each near-term proposed schedule in the near-term proposed schedule set.

An object of the present invention using a schedule-based load estimator is to automate the estimation process and allow an enterprise to easily and reliably select a rate structure offered by the utility, and their own production or operating schedule, so as to optimize its usage of the utility, profitability, and so forth.

In accordance with another aspect of the present invention, a schedule-based load estimator (SBLE) automatically combines historical utility metering data and historical factory production or other schedules with proposed near-term production or other schedules to produce an accurate near-term estimate of the total load profile (utility usage) for a single factory, building, unit, or other site. Optionally, the SBLE may also include non-scheduled factors, such as the time of day or weather reports and forecasts, in the estimation. This allows the enterprise to easily select the proposed schedule that optimizes its utility usage or cost.

In accordance with another aspect of the present invention, a schedule-based load estimator automatically produces a reliable near-term estimate of the load profile of a single utility-consuming site (such as a factory or office building) that incorporates production, operations, or other scheduling data. This allows the site to schedule production, maintenance, and other tasks to take advantage of fluctuating utility prices.

In accordance with various aspects and objects of the present invention, the estimations can be fully automated; implementation cost is greatly reduced, and is inexpensive to implement;

implementation does not require the installation of additional submetering equipment though it can take advantage of submeters if they are available;

operating cost is greatly reduced and the automated estimation costs far less to operate than the manual process, bringing it within the range of small and medium scale sites and enterprises;

accuracy is improved and human error is greatly reduced, making the estimation process more reliable;

opportunity for integration within the enterprise is improved and because the estimation process is automated, it can be incorporated into a fully automatic solution that also selects among schedules and rate offers to optimize profitability, utility cost, or other measurable factors;

opportunity for trade is improved;

the estimates can be placed into a standardized digital format and traded with the utility or other enterprises as information products;

the overall market for estimation is expanded and since the estimation is cheaper and easier to implement, small and medium scale enterprises can benefit from it;

usefulness of estimates outside the enterprise is improved;

when the estimation process is widely adopted and estimates are traded, estimates can become a significant resource for the utility in near-term planning for its business; demand for utilities can become more flexible; and since enterprises can adapt their own operations to utility prices, demand for utilities can follow short-term fluctuations in price which this leads to improved profitability for both the energy customer and the utility: this will also tend to keep utility prices down and reduce the need for construction of new utility plants and transmission infrastructure.

In accordance with another aspect of the present invention, a combined application of historical schedules, historical metering data, and near-term proposed schedules is made so as to improve the accuracy of estimating the near-term consumption of electric power or other utilities or resources by a building, production facility, or other site, where the schedules describe the arbitrary utilization of aggregated, utility-consuming resources within the site, as differentiated from the low-level scheduling of the individual machines, devices, or loads.

In accordance with another aspect of the present invention, a combined application of historical unscheduled factors data and unscheduled factors predictions, along with historical schedules, historical metering data, and near-term proposed schedules is made so as to improve the accuracy of estimating the near-term consumption of electric power or other utilities or resources by a building, production facility, or other site.

In accordance with another aspect of the present invention, automatic characterizing is performed of the contributions of the different parts of historical schedules and historical unscheduled factors to the near-term load of electric power or other utilities or resources by a building, production facility, or other site.

In accordance with another aspect of the present invention, a schedule-based load estimator is adapted to changes in the configuration or load characteristics of the site, thus assuring that reliable estimates will continue to be produced even when the site is changed.

Time points of a selected schedule are utilized to produce metering time requests and thus influence the measurement intervals of the metering equipment, for the purpose of improving the accuracy of further schedule-based load estimation.

Another object of the present invention (SBLE) is to provide accurate near-term estimates of the energy usage of a site, from information including:

Historical and proposed schedules of resources that affect the energy usage of the enterprise.

Historical energy usage measurements.

Historical data and near-term predictions of unscheduled factors that affect energy usage within the site, such as weather.

SBLE has business advantages for both the (enterprise-level) energy customer and the energy provider in a deregulated energy market.

BRIEF DESCRIPTION OF THE FIGURES

The invention will be more fully understood from the detailed description of preferred embodiments which follows, in conjunction with the Drawing, in which:

FIG. 1, which shows an overview of a system in accordance with the principles of the present invention; and FIG. 2, which shows a schedule-load correlator in accordance with the principles of the present invention.

DETAILED DESCRIPTION OF THE INVENTION

For the enterprise customer, key business advantages of the SBLE in accordance with the principles of the present invention, as compared to existing technology, are:

The enterprise can optimize its scheduling to take advantage of rapidly changing energy prices.

If the energy provider makes several different time-varying rate offers available, the enterprise can choose the rate offer and schedule that optimize the cost of the energy needed in the short term.

Minimal or no additional metering or other equipment or software infrastructure is required by the enterprise, assuming that they are using almost any modern scheduling software. In specific, no additional metering is required.

The near-term load estimates produced by the SBLE are a valuable information product for the energy provider, as well as for the enterprise. The enterprise can sell these load estimates to the energy provider, trade them for favorable energy rates, or otherwise use them for economic advantage.

The detailed scheduling data does not leave the enterprise. This helps assure the privacy of the enterprise's production or business processes.

FIG. 1 shows the architecture of the SBLE in accordance with the principles of the present invention. The site is assumed to schedule the use of energy-consuming resources, such as production machinery, lights, elevators and escalators, HVAC, and so forth, using some sort of software scheduler. For the near-term time period being scheduled, e.g., the next day, one or more near-term proposed schedules can be generated. These schedules are given as inputs to the schedule-load correlator component of the SBLE in accordance with the invention.

The energy provider uses metering equipment to monitor the energy consumption of its customers, which include the enterprise. The SBLE requires that consumption be monitored at fairly frequent intervals. A technical requirement for the time interval between sampling metering measurements, called the Nyquist criterion, is that the monitoring be done at least twice as often as the schedule changes. For most scheduling, this can easily be met by current technology, which measures energy consumption at 15-minute intervals. These consumption measurements are stored in a load history database by the energy supplier. The schedule-load correlator uses the historical metering data in the load history database as input. The time period over which this data is taken is arbitrary, but generally the more historical data used, the better the estimate will be.

The third input of the schedule-load correlator is a set of historical schedules for the site. If possible, these should be the schedules that were actually followed by the site, but if this is impractical then the selected schedules could be used with reduced accuracy.

The schedule-load correlator has two additional inputs. Both of these inputs represent the time-varying, unscheduled factors that affect energy consumption. Typically, these would include the hour of the day, day of the week, day of the year (Julian date), an indicator specifying whether the day is a holiday or not, temperature, humidity, percent solar input, etc. If the site has other, unique unscheduled factors that affect energy usage, these factors can be added as inputs to the schedule-load correlator, as long as they can be represented as an affine numeric scale of values and predicted with reasonable near-term accuracy.

The schedule-load correlator's function is to correlate the historic data, the near-term proposed schedules, and the predicted unscheduled factors, producing a near-term load estimate for each proposed schedule. The load estimate will be a sequence of time varying estimated load values, covering the time period for the proposed schedule. The function of the schedule-load correlator will be described in more detail later.

The load estimate for each schedule can be integrated with one or more near-term rate offers for the energy supplier, giving a predicted energy cost for implementing that schedule. Based on this and other information, the best available schedule/rate offer pair can be selected, and the schedule can be executed and the rate offer accepted. The executed schedule can be saved in the resource scheduling history database for later use.

If the enterprise has made an agreement to do so with the energy provider, it also sends the load estimate to the provider. The energy provider will frequently find this data valuable, in combination with the data of its other customers, to improve the accuracy of its own load forecasting.

The resource scheduling history database retains a set of historical schedules, that is, schedules which were executed in the past, and the date and time at which they were executed, as well as any other relevant parameters.

Preferably, each of these schedules should minimally identify a set of energy-consuming resources, such as machinery, and the times at which they were used. Many common scheduling programs represent schedules as sets of tasks, to which resources are applied. In these cases it can be derived from the actual representation of the schedule. This derivation is the job of the schedule-load correlator.

The resource scheduling history database also retains a set of historical unscheduled factors, that is, unscheduled factors which occurred as the schedule was being executed, and the time when they occurred.

This data can be stored by any convenient means, such as files, relational database, object-oriented database, etc. The format of the data must be compatible with the set of formats that are recognized by the schedule-load correlator.

Each schedule or historical unscheduled factor must be associated with the time to which it applies. If this time is not available, then the resource scheduling history database must maintain this information.

If historical schedules or historical data on unscheduled factors is available from other sources, then the resource scheduling history database may obtain this data indirectly from these sources, rather than storing local copies.

As part of its functions, the schedule-load correlator (SLC) performs the following:

Correlate historical resource usage (in historical schedules) and unscheduled factors to historical metering data using a linear regression, producing a weight data structure;

Using this correlation, and a prediction of the near-term unscheduled factors, produce a near-term load estimate for a near-term proposed schedule;

Maintain the consistency of these predictions as the site's processes change, or as data formats change.

FIG. 2 shows the architecture of the schedule-load correlator. The application of a programmed function to an input is shown as a lower-case letter "f" in a circle.

Any data within the SLC can be represented in any convenient format.

Historical schedules enter the SLC and are fed to a resource mapper and combiner. This component extracts from the schedules a historical resource usage data structure, i.e., the times at which each energy-consuming resource was used in each schedule, for any recognized schedule format.

If the resource can use energy at different levels (example: the resource is a machine with different modes), then the level of usage for that instance of resource usage is also extracted, or the resource is partitioned into separate resources in the historical resource usage data structure, one for each level of usage.

Similarly, an unscheduled factors mapper and combiner extracts the time and numeric level of each of the historic unscheduled factors, which are used in the estimation. The product of the unscheduled factors mapper and combiner is a historical unscheduled factor data structure.

A resource correlation function (RCF) is then applied to the historical resource usage data structure. The purpose of the resource correlation function is for cases where load is a non-linear function of resource usage. Similarly, an unscheduled factor correlation function (UFCF) is applied for cases where load is a non-linear function of the unscheduled factors. (Example: heating or cooling energy usage for a site usually varies in a twenty-four hour cycle, though not usually as a simple sinusoidal function. A Fourier series may be used in this case, and a different regression term produced for each element of the series.) RCFs and UFCFs may be either executable or non-executable content.

Similarly to the historical data, the near-term proposed schedule is mapped to its resources using a resource mapper component, and the same RCF that was applied to the historical data is applied to them. The unscheduled factors predictions are likewise fed to the unscheduled factors mapper and the same UFCF that was applied to the historical unscheduled factors data is applied to them.

A resampling component combines the outputs of the RCF and UFCF, and the historical metering data, to produce a single data structure of linear regression terms that affect load, at each time that those factors were measured. The historical metering data is also resampled by this component. Missing samples may be interpolated or simply ignored. The output of the resampling component is a pair of data structures: one representing the resampled metering data and the other representing the output data of the RCF and UFCF (the linearized combined historical factors data.) These two data structures have common time points.

The resampled metering data and linearized combined historical data are then processed by the linear regression component. The output of this component is a data structure of coefficients, one for each term in the dependent terms data.

A second resampling component resamples the predicted, linearized resource and unscheduled factors into a single data structure of linear regression terms. A linear equation multiplying component then multiplies this by the data structure of coefficients which was produced by the resampling and linear regression component, producing a near-term load estimate. The near-term load estimate represents the estimated load at each time in the near-term proposed schedule.

Thereafter, a correlation map maintains the following data within the SLC:

Resource format maps (not shown in FIG. 2). These are executable or non-executable maps that are used to map schedules in different formats into data structures containing their component resource usage, operating mode or fraction of usage, and the times that those resources are used.

Unscheduled factors maps (not shown in FIG. 2). These are executable or non-executable maps that are used to map unscheduled factors documents into data structures containing the numerical value(s) of each unscheduled factor and time it is in effect.

RCFs, as defined above.

UFCFs, as defined above.

The correlation map is shown as a discrete component for convenience only. It may also be partitioned in any convenient manner, or stored partially or totally outside the SLC.

To allow the enterprise to view, edit, and update the correlation map, a correlation map update application program interface (API) is shown. If the correlation map never changes in a particular implementation, or is changed by reinstallation of the SLC, then the correlation map update API is not necessary.

EXAMPLE

In the following exemplary and illustrative embodiment of the invention, the enterprise-level energy customer produces schedules that assign 100 energy-consuming resources, $R\_1$ through $R\_100$, to production tasks. Each production task has at least the following information:

A start time

An end time

A list of the resources it uses $R\_1$ through $R\_100$ are all machines on the production line. For the most part, the individual power consumption of $R\_1$ through $R\_100$ is constant whenever the resource is used. An exception is that $R\_2$ preheats the parts that are then fed into $R\_3$, and thus saves $R\_3$ the energy needed to heat them. $R\_3$'s power consumption is thus related to whether $R\_2$ is used or not.

The start and end times in the historic schedule form a set of historic schedule intervals, $I\_1$ through $I\_k$.

We will estimate the energy consumption of only one proposed schedule. The proposed schedule assigns resources $R\_1$ through $R\_100$ to tasks, as the historic schedule did. The proposed schedule is likewise divided into time intervals, $I\_k+1$ through $I\_n$.

The resources also change over time, so that they use different amounts of energy at different times over the historical schedule data. For example, $R\_1$ is a production line that initially included a worn-out drive motor. This drive motor was replaced on Jan. 6, 2000 with a new, energy-efficient motor. This means that the expected energy consumption of $R\_1$ is not constant over the entire historic schedule, but instead drops on January 6.

The only unscheduled factors that are considered for estimation are the time of day and the outside temperature. The energy use of the enterprise-level energy customer changes as a periodic function of the time of day. Also on Feb. 4, 2000, the site lowered the setpoints of its HVAC system to reduce heating costs between 11:00 PM and 4:00 AM. This means that the relationship between both of the unscheduled factors and energy consumption changes on February 4.

The unscheduled factors are also measured at discrete times. These times form a different set of intervals, $J\_1$ through $J\_m$. The unscheduled factors predictions are divided into time intervals $J\_m+1$ through $J\_p$.

The resource mapper and combiner produces the historic resource usage data structure, which can be represented as a matrix containing, for each time interval $I\_1$ through $I\_k$ in the historic schedule, the resources which were used during that interval. If the rows of the table represent resources and the columns represent time intervals, then the entries in the table represent the fraction that the resource was used in the schedule (0 if the resource wasn't used at all, 1 if it was fully used.)

TABLE 1

|  | $I\_1$ | $I\_2$ | ... | $I\_k$ |
|---|---|---|---|---|
| $R\_1$ | 0 | 0 | ... | 0.5 |
| $R\_2$ | 0 | 0 | ... | ... |
| ... | ... | ... | ... | ... |
| $R\_100$ | 1 | 0 | ... | 0 |
| $R\_101$ | 1 | 0 | ... | 0 |

Example Historic Resource Usage Data Structure (Rows=Resources, Columns=Historic Schedule Intervals)

The resource mapping maps from the resource identifiers in the historical schedule to rows in the matrix. In this example, the resource mapping is the identity function, for all resources except $R\_1$. The resource mapping for $R\_1$ maps all uses of $R\_1$ before Jan. 6, 2000 to a synthetic resource, $R\_101$, which does not exist in the historical schedule. $R\_101$ represents the energy used by $R\_1$ before it was updated. The resource mapping of $R\_1$ after Jan. 6, 2000 is the identity function, so that $R\_1$ will coincide with $R\_1$ on the proposed schedules.

Unscheduled Factors Mapper and Combiner

Similarly, the unscheduled factors mapper and combiner can formulate its results in matrix form. As in the resource usage data structure, we need to account for the fact that, over history, the way in which the unscheduled factors can influence the load may change.

For example, on Feb. 4, 2000 in the present exemplary embodiment, the correlation of load with both time of day and outside temperature changed, due to the changed HVAC setpoint. Assuming that time of day is represented as $U\_1$ and temperature is represented as $U\_2$, we would separate their contributions before and after February 4 as before.

The synthetic unscheduled factors U_3 and U_4 represent the contributions of time and temperature, respectively, before February 4.

Additionally, we cannot assume that the load due to an unscheduled factor is always a linear function of that factor, as we could in the historic resource usage data structure. For instance, the contribution to the load due to time of day is likely to be a Fourier series of the time of day (s1 sin(t)+c1 cos(t)+s2 sin(2t)+c2 cos(2t)+s4 cos(4t) . . . ) Setting the time of day contribution term to zero after February 4 would produce a constant contribution of c1+c2+c4 . . . for that period.

We need to preserve both the value of the unscheduled factor during each time interval, and whether it contributes to load during that interval. To do this, we can use two matrices: the unscheduled factor value matrix (containing the unscheduled factor value for each interval) and the unscheduled factor coefficient matrix (containing one if the unscheduled factor of each row makes a contribution during the interval of each column, and zero if it does not.)

TABLE 2

|     | J_1      | J_2      | ... | J_m      |
|-----|----------|----------|-----|----------|
| U_1 | 40009987 | 40018523 | ... | 40109474 |
| U_2 | 50       | 48       | ... | 33       |
| U_3 | 40009987 | 40018523 | ... | 40109474 |
| U_4 | 50       | 48       | ... | 33       |

Example Unscheduled Factor Value Matrix
(Rows=Unscheduled Factors, Columns=Intervals)

TABLE 3

|     | J_1 | J_2 | ... | J_m |
|-----|-----|-----|-----|-----|
| U_1 | 0   | 0   |     | 1   |
| U_2 | 0   | 0   |     | 1   |
| U_3 | 1   | 1   |     | 0   |
| U_4 | 1   | 1   |     | 0   |

Example Historic Unscheduled Factor Coefficient Matrix
(Rows–Unscheduled Factors, Columns=Historic Unscheduled Factors Intervals)

The historic resource usage data structure can be thought of as representing either a value matrix or a coefficient matrix. The two are equivalent.

The resource correlation function transforms the historical resource usage data structure into a matrix whose columns represent time and whose rows are linearly related to energy consumption. The result is a linearized historic resource matrix.

For the most part, the resource correlation function is identity. However, a synthetic resource, R_102, is added for the special case of R_2 and R_3. R_102 equals R_2 times R_3.

The unscheduled factors correlation function (UFCF) works in a similar way on the unscheduled factors value matrix. However, the UFCF creates synthetic unscheduled factors U_5, U_6, etc. that correspond to the s1, c1, s2, c2, etc. terms of the Fourier series that is used to represent the linearized time-of-day dependent part of the load. Only a limited number of such factors are created. The result is a linearized historic unscheduled factors matrix.

The unscheduled factors correlation function also uses the unscheduled factors coefficient matrix to zero out unscheduled factors at those times when they are not relevant to the prediction. As mentioned before, this must be done after the linearization is applied.

The Unscheduled Factors Mapper and Resource Mapper work in substantially the same way that the Unscheduled Factors Mapper and Combiner and the Resource Mapper and Combiner do. They produce a linearized unscheduled factors prediction matrix and a linearized proposed resource usage matrix respectively. However, they do not need to combine any incompatible parts of the unscheduled factors predictions or the near-term proposed schedules, since none of their terms is expected to change its coefficients over the time period for the prediction. (If this is not the case, then the Unscheduled Factors Mapper and Combiner and the Resource Mapper and Combiner could be used instead.)

The Resampling Component resamples the output of the correlation functions to produce two matrices whose columns represent the same time intervals. (Resampling may be done using linear interpolation or any other convenient algorithm.)

To understand why resampling is needed, note that the historic resource intervals are I_1 through I_k, while the historic unscheduled factors use a different set of intervals, J_1 through J_m. The columns in the linearized historic resource matrix thus correspond to different times than the columns in the linearized historic unscheduled factors matrix. The resampling is done to produce a single linearized matrix whose columns correspond to the same time intervals, and whose rows contain the resampled data from both of the above matrices.

The matrix that results from resampling the outputs of the two correlation functions is called the linearized combined historical factors matrix. The Linear Regression Component then performs linear regression of the resampled metering data (the dependent variable) against the linearized combined historical factors (independent variable.) The result is a matrix of coefficients for each factor (row) in the linearized combined historical data matrix.

The second Resampling Component resamples the linearized unscheduled factors predictions and the near-term proposed schedules to place them into the same time intervals. The result is called the linearized predicted factors matrix.

The linearized predicted factors matrix, and the matrix of coefficients produced by the Linear Regression Component, are multiplied by the Linear Equation Multiplying Component in a matrix dot product. The result is the near-term load estimate matrix, with a predicted load for each time period in the linearized predicted factors matrix.

As an enhancement, the SBLE system can relay to the utility provider those time points in the near-term future where the load is expected to change, and the utility would configure the metering system so that meter data is collected and stored at those times. This would improve the accuracy of measurement for the SBLE. The load would be precisely known for every interval in the schedule, rather than at intervals that might be spread across multiple scheduling intervals. (If there are unplanned changes to the schedule, then these changes can also be transmitted to the energy provider.)

The metering time extractor derives these time points from the selected schedule and its near-term load estimates. (An alternative approach would be to derive the time points from some combination of the proposed schedules, perhaps all of them, in case a different schedule is actually used.) The resulting set of metering time requests is then sent to the energy provider, which can use them to send metering commands to the metering equipment. The energy provider would, of course, be free to ignore some or all of the metering time requests.

If the SBLE system relays its complete load profile, rather than just the time points, to the utility provider, then the utility provider can aggregate this information to produce a very accurate real-time load profile of all its customers who submit SBLE data.

In a variation of this approach, the SBLE could drive the same or separate metering equipment itself, without sending the information through the energy provider.

While the present invention has been described by way of exemplary embodiments, it is noted that various alternative embodiments and methods are merely alternative and equivalent to features herein described.

For example:

Data structures and functions can be cast into any arbitrary representation.

The historical schedules and historical unscheduled factors in the Resource Scheduling History Database can be stored outside of the SBLE system.

Any set of connected components in the SBLE could be combined into a single component.

The Resource Correlation Functions and/or Unscheduled Factors Correlation Functions can be stored in a place other than the Correlation Map.

The SBLE system does not need to be contained within the enterprise, but could be operated outside the enterprise.

Historical metering data could be obtained from a source other than the energy provider.

The invention has been described by way of exemplary embodiments. One of skill in the art to which it pertains will understand that various changes may be made without departing from the spirit of the invention. For example, while the exemplary embodiments related primarily to electrical supply utilities and consumers, the invention is applicable to any parallel situation wherein the commodity is a water supply, fuel gas supply, or the like and the invention should so be understood to be applicable to such utilities.

What is claimed is:

1. A method for determining by a utility energy consumer an estimated load for each time spot in a near-term proposed schedule set offered by a utility energy provider comprising:

receiving by said utility energy consumer said near-term proposed schedule set from said utility energy provider;

obtaining a historical resource usage, a historical unscheduled factors, a historical metering data and a prediction of near-term unscheduled factors of said utility energy consumer;

correlating said historical resource usage and said historical unscheduled factors to said historical metering data to produce a data structure;

using said data structure and said prediction of near-term unscheduled factors to produce a near-term load estimate;

wherein said near-term load estimate represents said estimated load for each time in said near-term proposed schedule.

2. The method of claim 1, further comprising mapping said near-term load estimate against a rate structure set provided by said utility energy provider to determine an optimal rate structure.

3. The method of claim 2, further comprising selecting said optimal rate structure from said rate structure set.

4. The method of claim 1, further comprising said utility energy consumer sending said near-term road estimate to said utility energy provider.

5. The method of claim 1, further comprising updating at least one of said historical resource usage, said historical unscheduled factors, said historical metering data and said prediction of near-term unscheduled factors.

* * * * *